United States Patent [19]
Cherry et al.

[11] Patent Number: 5,432,516
[45] Date of Patent: Jul. 11, 1995

[54] RADAR OBSTACLE DETECTION SYSTEM WITH SELF TEST

[75] Inventors: James R. Cherry, Windham, N.H.; Abel Raynus, Brookline, Mass.

[73] Assignee: Armatron International, Inc., Melrose, Mass.

[21] Appl. No.: 181,608

[22] Filed: Jan. 13, 1994

[51] Int. Cl.6 ............................................. G01S 13/00
[52] U.S. Cl. ......................................... 342/28; 342/70; 342/170; 342/171; 340/435; 340/436
[58] Field of Search ..................... 342/27, 28, 70, 71, 342/72, 170, 171; 340/435, 436

[56] References Cited

U.S. PATENT DOCUMENTS 3,697,876 10/1972 Robbins et al. .................. 325/67
5,287,111 2/1994 Shpater ............................ 342/28

Primary Examiner—J. Woodrow Eldred
Attorney, Agent, or Firm—Samuels, Gauthier & Stevens

[57] ABSTRACT

A radar system which detects the presence of objects in the proximity of a movable vehicle includes a signal source which generates object detection signals, a first antenna which transmits the object detection signals and receives the object detection signals as reflected signals reflected from an object in the proximity of the movable vehicle. The first antenna is further operable for receiving non-reflected test signals. A second antenna is provided for transmitting test signals which correspond to a delayed portion of the object detection signal generated by the signal source. A control unit is responsive to the reception of the reflected signals for providing an indication of the detection of the object, and is responsive to the reception of the test signals for providing an indication of the operability of the system.

10 Claims, 2 Drawing Sheets

RADAR OBSTACLE DETECTION SYSTEM WITH SELF TEST

BACKGROUND OF THE INVENTION

The invention relates to object detection systems in general and, more particularly, to an object detection system and method with a self test operation.

Various object detection systems have been proposed to warn drivers of the presence of an object in the path of a movable vehicle. Typically, such warning systems provide a suitable warning signal either audible or visual or both, upon detecting the presence of an object in the path of a moving vehicle.

In consideration of the importance of the operability of such object detection systems, it is often desirable for such systems to include self testing capabilities. For example, U.S. Pat. No. 5,160,927, of common Assignee and incorporated herein by reference, describes an object detection system with a self test feature wherein object detection signals transmitted by the transmitter are received directly be the receiver for a self test check. Another object detection system with a self test feature is described in U.S. Pat. No. 4,910,512 in which signals provided by a transmitter are reflected by acoustic shunts or acoustic reflectors for reception by a receiver for self testing purposes. Furthermore, U.S. Pat. No. 4,561,064 to Brüggen et al. describes an object detection system with a self test feature in which a fixed reflector located on a vehicle reflects signals from the transmitter to the receiver to evaluate the system.

Another obstacle detection system which utilizes self testing features is described in U.S. Pat. No. 5,235,315, of common Assignee and incorporated herein by reference, in which a controller is provided for adjusting the gain and signal threshold of a receiver so that the receiver initially is able to detect reflections from irregularities in the ground surface. Once this receiver receives a transmitted signal reflected from the ground surface, an indication is provided that the system is in a ready or operable state.

It is accordingly an object of the present invention to provide an object detection system with a self test operation which does not require additional reflecting elements and/or specific positioning of the transmitter and receiver in order to avoid interference caused by preexisting structures on the vehicle, or reliance upon signals reflected from outside the systems such as a ground surface.

SUMMARY OF THE INVENTION

The present invention is a radar system which detects the presence of objects in the proximity of a movable vehicle includes a signal source which generates object detection signals, a first antenna which transmits the object detection signals and receives the object detection signals as reflected signals reflected from an object in the proximity of the movable vehicle. The first antenna is further operable for receiving non-reflected test signals. A second antenna is provided for transmitting test signals which correspond to a delayed portion of the object detection signal generated by the signal source. A control unit is responsive to the reception of the reflected signals for providing an indication of the detection of the object, and is responsive to the reception of the test signals for providing an indication of the operability of the system.

DETAILED DESCRIPTION OF THE ILLUSTRATED EMBODIMENTS

Figure 1:
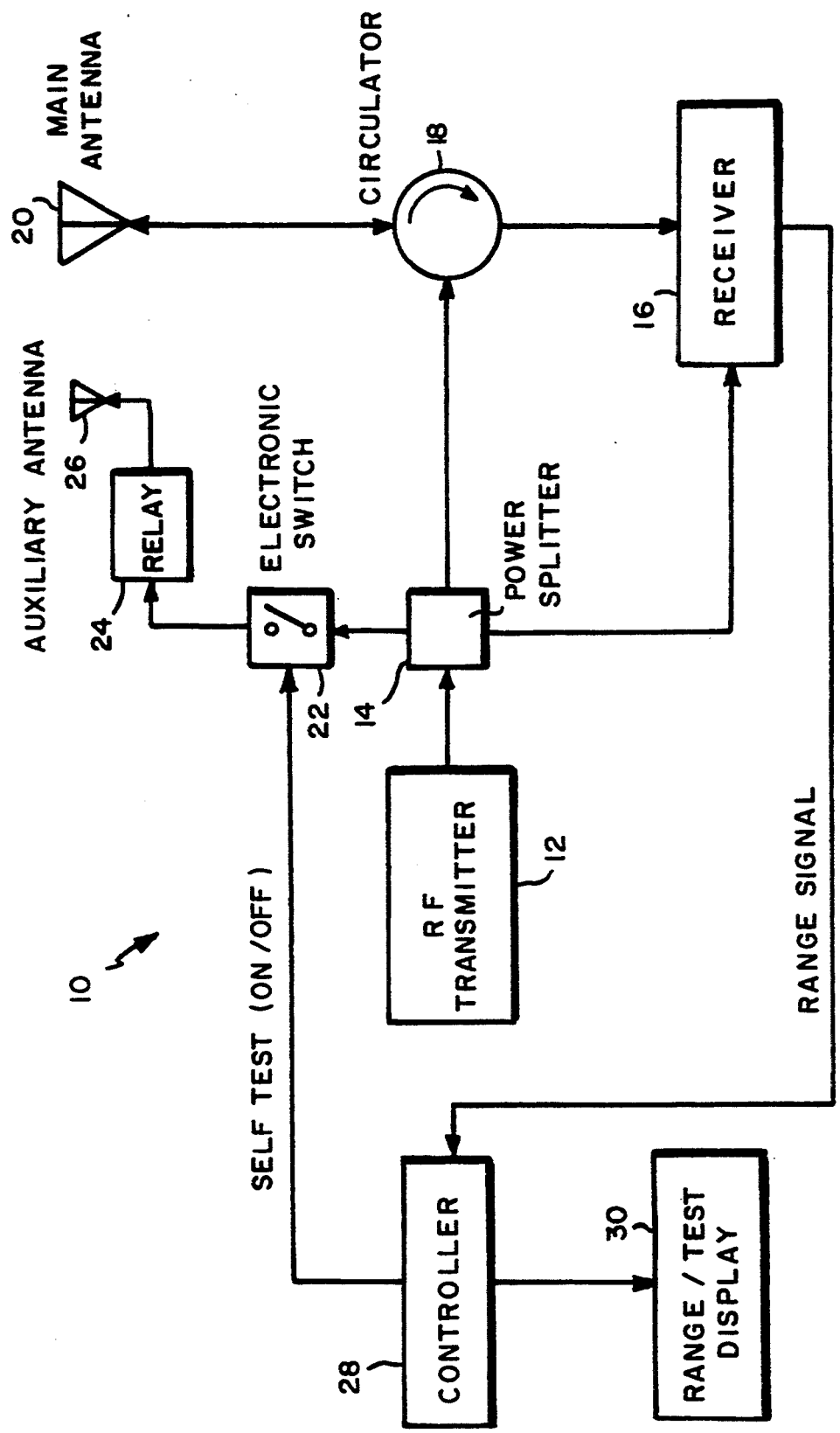
FIG. 1 shows a schematic block diagram of an object detection system in accordance with the present invention.

With reference now to FIG. 1, a functional block diagram of an object detection system 10 in accordance with the present invention is shown. For exemplary purposes, the system 10 will be described as a continuous wave frequency-modulated (FM-CW) radar ranging system. In such systems, a radio frequency (RF) interrogation signal, frequency modulated with a given modulation wave form, is transmitted toward a target and reflected therefrom back to the interrogating system. The reflected signal as received at the interrogating system is delayed in time, and hence shifted in frequency, from the instantaneous interrogation signal by an amount ($\tau$) proportional to the range (R) of the target.

Figure 2:
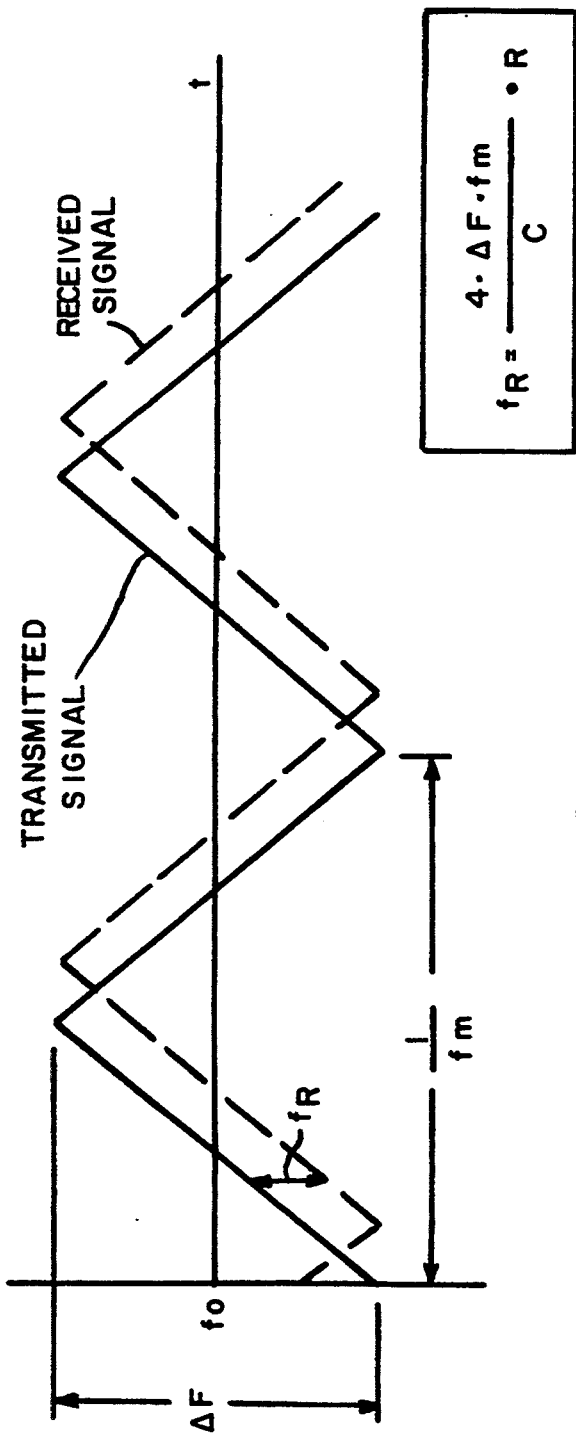
FIG. 2 shows the frequency shift between the transmitted signal and the received signal of the present object detection system when the interrogation signal is modulated by a triangular wave form.

For example, with reference to FIG. 2, when the interrogation signal is modulated by a triangular wave form having a peak to peak value of $\Delta F$, a period of $1/f_m$, the frequency shift or difference frequency $f_R$, also commonly known as the beat frequency, as generated by a suitable filtered mixer receptive of the reflected signal and a signal indicative of the interrogation signal, is equal to the time derivative of the frequency of the interrogation signal times the round trip time delay, $\tau$, and may be expressed as the formula $f_R = df/dt \cdot \tau = 4R(\Delta F \cdot f_m)/C$ where C is the speed of light. Therefore, the range, R, or distance between the target and the interrogating system and, additionally, the range rate of the target relative to the system is determined by the measurement of the frequency shift $f_R$. It will, however, be appreciated by those of skill in the art that the present invention may be utilized in radar systems with other forms of modulation, such as amplitude modulation and pulse modulation frequency signals.

The system 10 includes a radio frequency signal source transmitter which generates the RF signal and supplies same to a signal power splitter 14. The signal power splitter serves to split or divide the RF signal, and subsequently distributes the signal to other system components. The power splitter provides the signal to a conventional three port circulator 18. The circulator 18 is coupled to a main antenna 20 for transmitting the object detection signals to objects proximate to the systems, and receives the reflected signals from those objects.

The reflected signals received by the antenna 20 are returned to the circulator 18 and forwarded to a receiver unit 16. The receiver unit functions to determine the frequency shift or difference frequency $f_R$ between the reflected signal and a sample of the transmitted signal as provided directly from the signal power splitter 14. This arrangement of components enables measurement of the range of the object reflecting the signals by a controller 28. The process by which the range is determined is well known in the art.

In accordance with the present invention, the system 10 is provided with a self testing operation as described hereinafter. The signal power splitter 14 provides a portion of the original RF signal to a controlled switch 22, which is responsive to a control signal provided from the controller 28. Accordingly, when the system is in a self test mode, the controller 28 provides the control signal to the switch 22 so that the object detection signals are provided to a delay unit 24 and thereafter to an auxiliary antenna 26. The delay unit 24 functions to delay the object detection signal by a predetermined amount, which is subsequently transmitted by the auxiliary antenna 26.

The delayed test signal is thereafter directly received at the main antenna 20 and processed through the receiver 16 and controller 28. Since the delayed signal is known by the controller 28, the system is capable of determining whether the transmitting and receiving functions of the system are operational. The controller then signals the display unit 30 to provide an indication of operability of the system.

As an alternative use of the delayed signal which is transmitted by the auxiliary antenna 26, the received signal at the main antenna 20 can be utilized to calibrate the system. For example, the delayed signal from the auxiliary antenna 26 can be adjusted to correspond to a fixed distance to a reflecting object. Therefore, since the controller 28 is aware of the amount of delay in the delayed signal, the controller may adjust the other components of the system in response to variations from the received delayed signal.

It will be appreciated by those of skill in the art that the self testing mode may be initiated by the controller 28 either automatically or manually so as to continuously or intermittently alternate between the self test mode and the obstacle detection mode during system operation.

Figure 3:
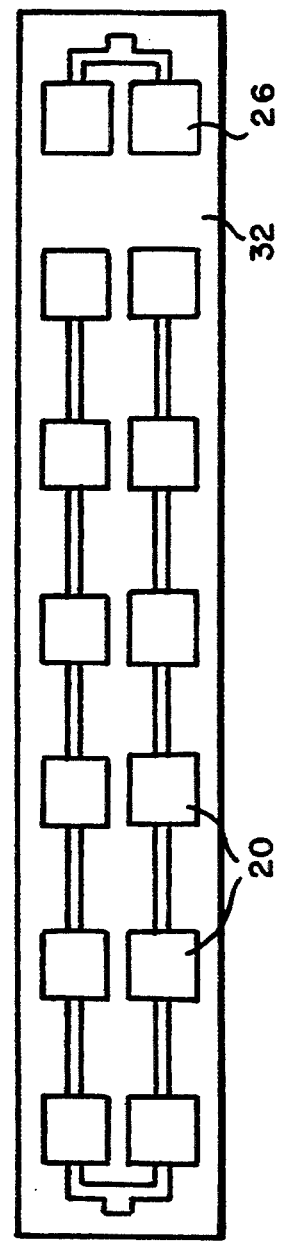
FIG. 3 shows an embodiment of the present object detection system in which the RF transmitter, receiver and the antennas are disposed on a common circuit board.

According to a preferred embodiment of the present invention, the RF transmitter 12 and receiver 16 are constructed with monolithic microwave integrated circuits (MMICs) and the antennas 20, 26 are printed circuit antennas as is well known in the art. In addition, the auxiliary antenna 26 may be printed with the main antenna 20 on a common circuit board 32 as shown in FIG. 3 so as to conserve both space and cost of the system.

The foregoing description has been set forth to illustrate the invention and is not intended to be limiting. Since modifications of the described embodiments incorporating the spirit and substance of the invention may occur to persons skilled in the art, the scope of the invention should be limited solely with reference to the appended claims and the equivalents.

What is claimed is:

1. A radar system for detecting the presence of objects in the proximity of a movable vehicle, said system comprising:
    a signal source operable for generating object detection signals;
    a first antenna operable for transmitting said object detection signals and for receiving said object detection signals as reflected signals reflected from an object in the proximity of said movable vehicle, said first antenna further operable for receiving non-reflected test signals;
    a second antenna operable for transmitting said test signals, said test signals corresponding to a delayed portion of said object detection signals generated by said signal source; and
    a control unit responsive to the reception of said reflected signals for providing a first signal indicative of the detection of said object, and responsive to the reception of said test signals for providing a second signal indicative of the operability of said system.

2. The system of claim 1, wherein said object detection signals comprise modulated frequency signals.

3. The system of claim 2, wherein said object detection signals comprise frequency modulated continuous wave signals.

4. The system of claim 2, wherein said object detection signals comprise amplitude modulated signals.

5. The system of claim 2, wherein said object detection signals comprise pulse modulated signals.

6. The system of claim 1, wherein said test signal corresponds to a predetermined fixed range.

7. The system of claim 1, wherein said control unit utilizes said test signal to calibrate said system.

8. The system of claim 1 further comprising a delay circuit associated with said second antenna.

9. The system of claim 8, wherein said delay circuit comprises a signal switch and a delay unit coupled to one another, said signal switch being further coupled to said signal source and said delay unit being further coupled to said second antenna.

10. The system of claim 9, wherein said control unit is further operable for controlling said signal switch to feed a portion of said object detection signals to said delay unit in order to create said test signals.

* * * * *